(12) United States Patent
Eriksson et al.

(10) Patent No.: US 7,093,914 B2
(45) Date of Patent: Aug. 22, 2006

(54) DEVICE FOR MANOEUVRING A TENSION WHEEL OF A TRACKED VEHICLE

(75) Inventors: Claes Eriksson, Arnasvall (SE); Anders Bodin, Ornskoldsvik (SE)

(73) Assignee: BAE Systems Hagglunds Aktiebolag, Ornskoldsvik (SE)

( * ) Notice: Subject to any disclaimer, the term of this patent is extended or adjusted under 35 U.S.C. 154(b) by 4 days.

(21) Appl. No.: 10/819,115

(22) Filed: Apr. 7, 2004

(65) Prior Publication Data

US 2004/0207258 A1  Oct. 21, 2004

(30) Foreign Application Priority Data

Apr. 9, 2003 (SE) .................................... 0301046

(51) Int. Cl.
*B62D 55/14* (2006.01)
(52) U.S. Cl. .................... 305/143; 305/156; 180/405; 474/110
(58) Field of Classification Search ................ 305/145, 305/143, 156, 155, 152, 25, 151, 153, 125; 180/9.5, 9.54, 9.49, 9.46, 9.56; 474/110, 474/101, 138, 135
See application file for complete search history.

(56) References Cited

U.S. PATENT DOCUMENTS 2,843,431 A * 7/1958 Beaufort .................... 305/145
3,154,317 A   10/1964 Gustafsson
5,316,381 A    5/1994 Isaacson et al.
6,273,530 B1 * 8/2001 Johnson et al. ............. 305/116
6,315,374 B1 * 11/2001 Johansson ................... 305/145

FOREIGN PATENT DOCUMENTS

| DE | 25 21 145 | 11/1976 |
| SE | 468 939 | 4/1993 |
| SU | 383645 A | * 10/1973 |
| SU | 677979 A | * 8/1979 |
| SU | 806517 | 2/1981 |
| WO | WO 99/17978 | 4/1999 |

* cited by examiner

Primary Examiner—Frantz F. Jules
(74) Attorney, Agent, or Firm—Young & Thompson

(57) ABSTRACT

Device for manoeuvring a tension wheel in a chassis of a tracked vehicle, in which the tension wheel is rotatably mounted on a telescopic rocker arm (12). The rocker arm can, on the one hand, be lengthened and shortened by a first hydraulic cylinder and, on the other hand, swivelled about a transverse axis (14) by a second hydraulic cylinder for the purpose of raising and lowering the tension wheel. The first hydraulic cylinder is designed to act upon a lever arm (58) of a sleeve (54) rotatable in a hub part (20) of an inner part (18) of the rocker arm (12), which sleeve has an eccentrically mounted crank pin (52) which is hinge-connected to an outer part (22) of the rocker arm for the purpose of displacing the latter relative to the inner arm part, in the event of a mutual rotation motion between the sleeve (54) and the hub part (20) of the inner rocker arm part, in such a way that the rocker arm is lengthened upon a downward swivel motion of the arm and the tension wheel.

13 Claims, 4 Drawing Sheets

DEVICE FOR MANOEUVRING A TENSION WHEEL OF A TRACKED VEHICLE

TECHNICAL FIELD

The present invention relates to a device for manoeuvring a tension wheel in a chassis of a tracked vehicle, in which the tension wheel is rotatably mounted on a free end of a telescopic rocker arm mounted pivotably about a transverse axis in the vehicle, the rocker arm, on the one hand, being able to be lengthened and shortened by means of a first drive mechanism and, on the other hand, being able to be swivelled about the transverse axis by means of a second drive mechanism for the purpose of raising and lowering the tension wheel.

PRIOR ART

In order to adapt and optimize the running characteristics of a tracked vehicle to the surface on which it is driven, it has previously been proposed (see, for example, SE 468 939 B) to vary the vertical position of the tension wheel of the tracked vehicle between an upper position, when the vehicle is being driven on a hard surface offering firm support, and a lowered position, when the vehicle is being driven on a soft surface offering weak support, such as deep snow, arable land or swamp. At the same time, it is desirable to keep the track tension somewhat lower when the tension wheel is raised so as to suffer less track wear when travelling on a hard surface, and to keep the track tension somewhat higher when the tension wheel is lowered so as to reduce the specific ground pressure when travelling on a soft surface. In the case of the device according to SE 468 939 B, two coupled-together hydraulic cylinders are used for this purpose, in which a first of the cylinders forms a telescopic rocker arm for the tension wheel and the second forms a manoeuvring cylinder for swivelling the first cylinder. The first cylinder is pivotably mounted at a point which lies closer to the lower than to the upper running part of the crawler track of the vehicle, meaning that the the tension wheel, when the first cylinder is swivelled down, automatically stretches the crawler track somewhat.

SUMMARY OF THE INVENTION

It is an object of the present invention to produce a device for manoeuvring a tension wheel in a chassis of a tracked vehicle, in which the rocker arm supporting the tension wheel can be lengthened or shortened at the same time as being swivelled downward or upward, respectively, by means of a single drive mechanism, the tension wheel being able to be made to automatically tension the track when the rocker arm is swivelled down, without the centre of swivel of the arm needing to be situated asymmetrically between the upper and lower running parts of the track.

For this purpose, the device according to the invention, as referred to in the introduction, is characterized in that the first drive mechanism is designed to be able to rotate a sleeve rotatable about the transverse axis in a hub part of an inner part of the rocker arm, which sleeve has an eccentrically mounted crank pin which is hinge-connected to an outer part of the rocker arm for the purpose of displacing the latter relative to the inner arm part, in the event of a mutual rotation motion between the sleeve and the hub part of the inner rocker arm part, in such a way that the rocker arm is lengthened upon a downward swivel motion of the arm and the tension wheel by courtesy of the second drive mechanism.

The invention is described in greater detail below with reference to the appended drawings.

DETAILED DESCRIPTION OF A PREFERRED EMBODIMENT

Figure 1:
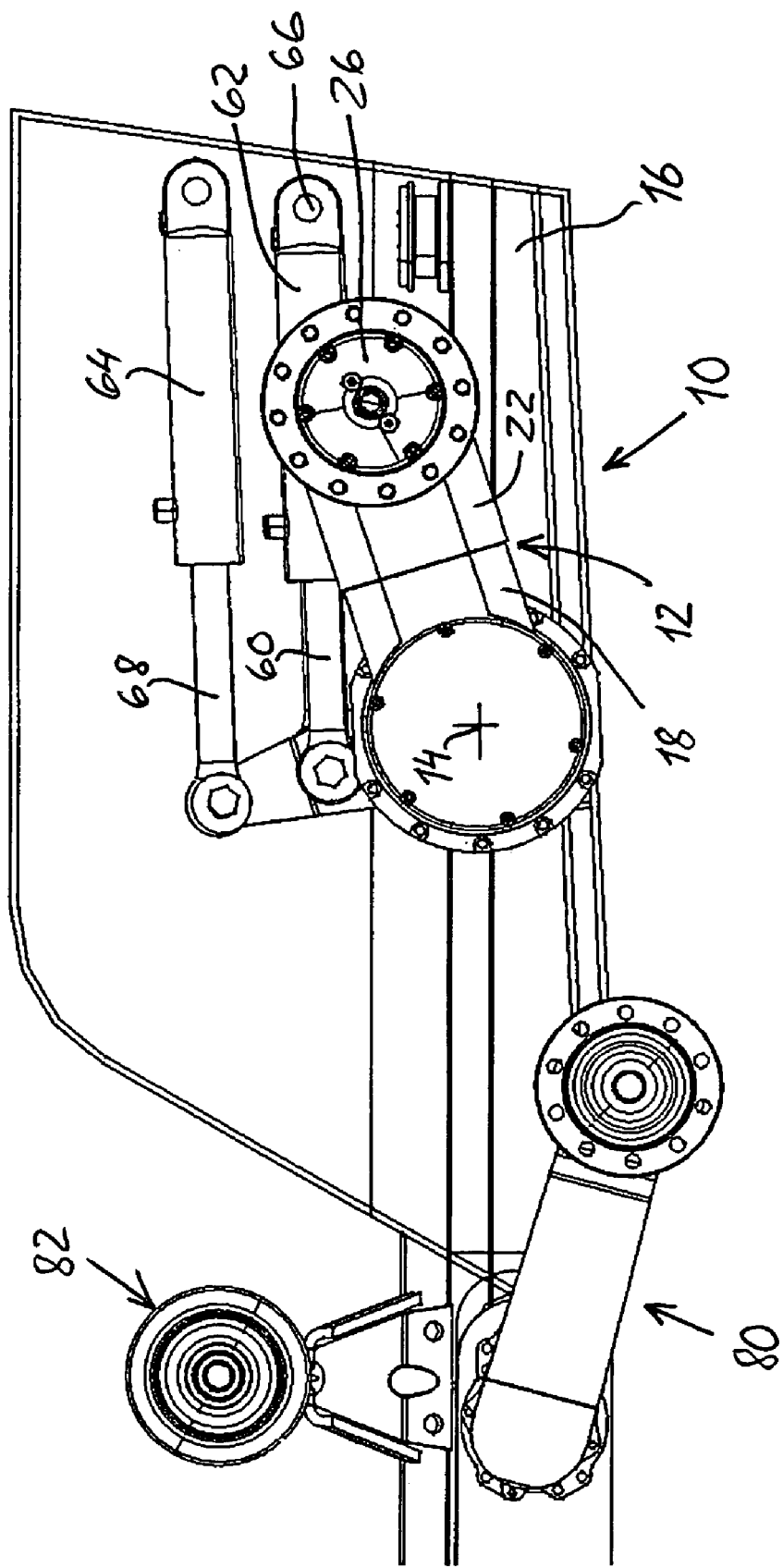
FIG. 1 is a side view of a tension wheel station in the rear portion of a chassis of a tracked vehicle, in which a telescopic, tension-wheel-supporting rocker arm assumes a swivelled-up, withdrawn position.
Figure 2:
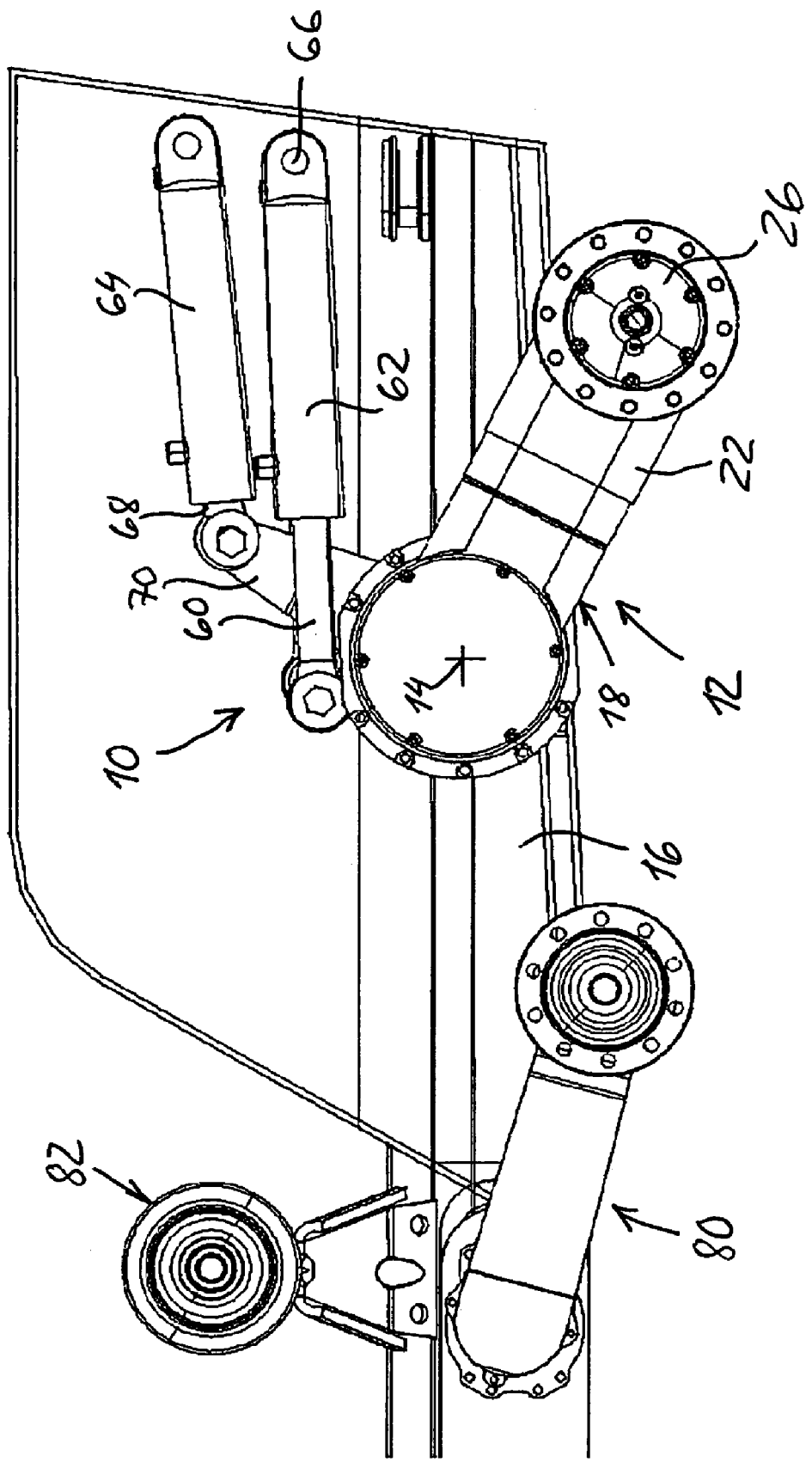
FIG. 2 is a view similar to FIG. 1, but showing the rocker arm in a swivelled-down, projected position.

In FIGS. 1 and 2, a tension wheel station on a rear portion of a tracked vehicle is denoted by 10. The tension wheel station 10 comprises a telescopic rocker arm 12, which is pivotably mounted about a transverse axis 14 in a frame or a rigid hull 16 of the vehicle. The rocker arm 12 has an inner arm part 18 having a hub portion 20 (FIG. 3), which is rotatably mounted in the hull 16, and an outer arm part 22 mounted displaceably in the inner part 18. The outer arm part 22 supports on its outer end an axle journal 24 (FIG. 3) for a tension wheel hub 26, in which a track tension wheel (not shown) can be mounted.

Figure 3:
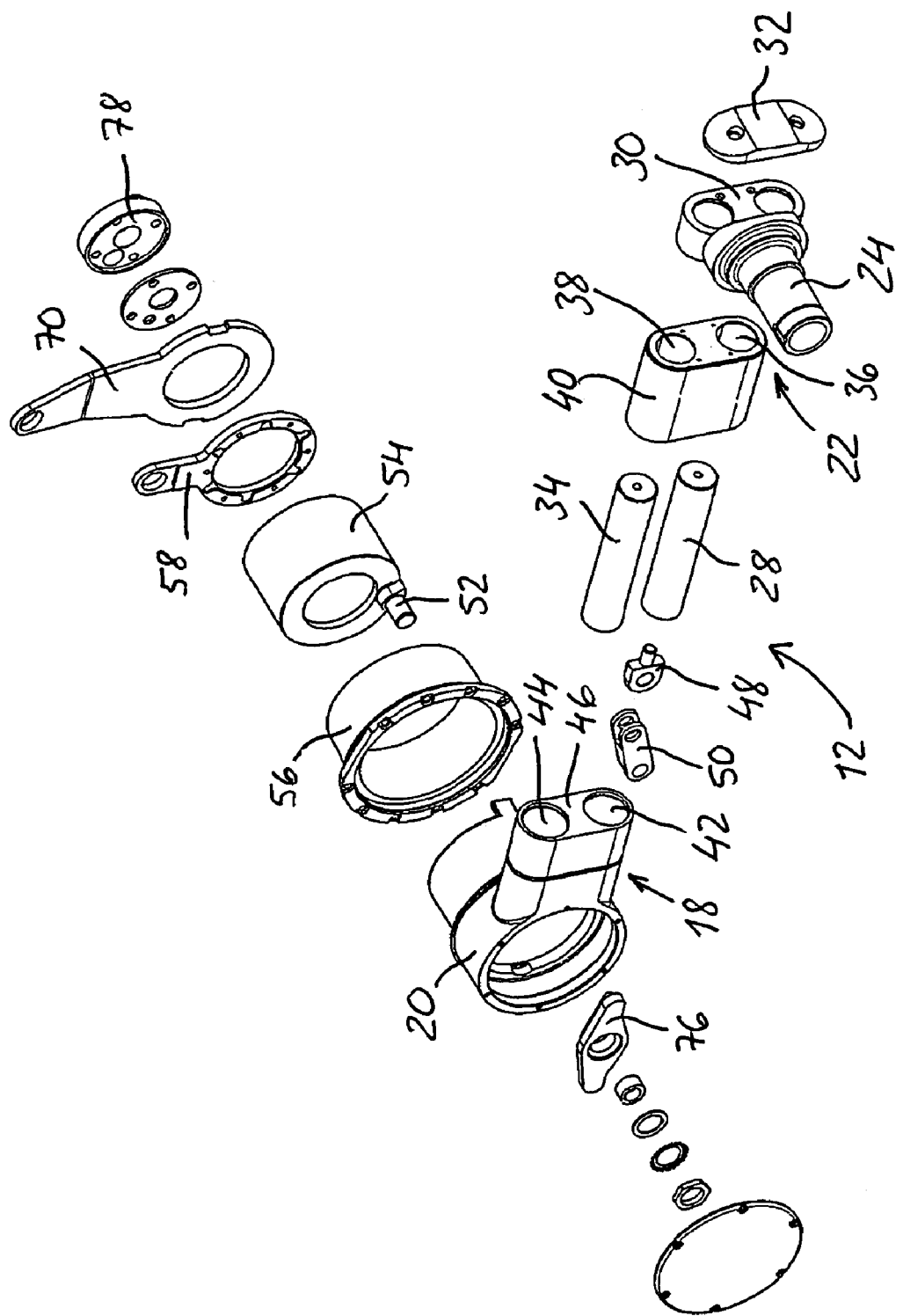
FIG. 3 is an exploded view in perspective of the rocker arm according to the invention.

As can be seen in FIG. 3, the rocker arm 12 has an oblong cross section in the vertical direction for increased rigidity in the swivel plane and comprises a lower connecting rod 28, which is fastened in a rear portion 30 of the axle journal 24 with the aid of a locking plate 32. A guide rod 34 situated above the connecting rod 28 is likewise fastened in the portion 30 of the axle journal 24 by means of the locking plate 32. The two rods 28, 34 extend through respective ducts 36, 38 in the frame part 40 of the outer arm part 22 and slidably through corresponding ducts 42, 44 in a frame part 46 of the inner arm part 18. The lower connecting rod 28 has, on its inner end, a lug 48, in which a link 50 is hinge-fastened. The other, inner end of the link 50 is hinge-connected to an eccentric pin 52, directed parallel with the transverse axis 14, on a sleeve 54 rotatable in the hub portion 20. The hub portion 20 is, in turn, rotatably mounted in a housing 56 mounted in a rotationally secure manner in the frame 16. Connected in a rotationally secure manner to the sleeve 54 is a lever arm 58. A piston rod 60 (FIGS. 1 and 2) of a first hydraulic cylinder 62 is hinge-connected to the lever arm 58 so as, when the piston rod 60 is thrust into the cylinder 62, to rotate the eccentric sleeve 54 in the hub portion 20 and hence displace the outer arm part 22 into the inner arm part 18 through the agency of the lower connecting rod 28. The cylinder 62 is hinge-fastened in a hull-fixed part of the vehicle by way of a pivot pin 66. Correspondingly, the outer arm part 22 can be retracted from the inner arm part 18 when the piston rod 60 is retracted from the cylinder 62, in order thereby to produce an extension of the rocker arm and hence a stretching of a crawler track (not shown) of the vehicle, running around the tension wheel (likewise not shown).

A second hydraulic cylinder 64, situated above and essentially parallel with the first hydraulic cylinder 62, is hinge-connected on its rear end to a hull-fixed part of the vehicle. A piston rod 68 of the second cylinder 64 is hinge-connected to a further lever arm 70, which is connected in a rotationally secure manner to the hub portion 20 of the inner arm part 18, so as, when the piston rod 68 is thrust into the cylinder 64, to swivel the rocker arm 12 in a swivel direction downward about the transverse axis 14 from the swivelled-up position shown in FIG. 1 to the swivelled-down position shown in FIG. 2.

The upper, second hydraulic cylinder 64 is configured so as, when the rocker arm 12 is swivelled down (FIG. 2), to form a shock absorber to allow spring deflection motions of the tension wheel, the oil in the cylinder 64 being able to be allowed to flow through a constriction (not shown) and, at high inward deflection or outward deflection velocity, also through a pressure limiter (not shown). In a swivelled-up position of the rocker arm 12 (FIG. 1), the cylinder 64, on the other hand, is hydraulically locked so as to prohibit any swivel motion of the rocker arm 12.

Figure 4:
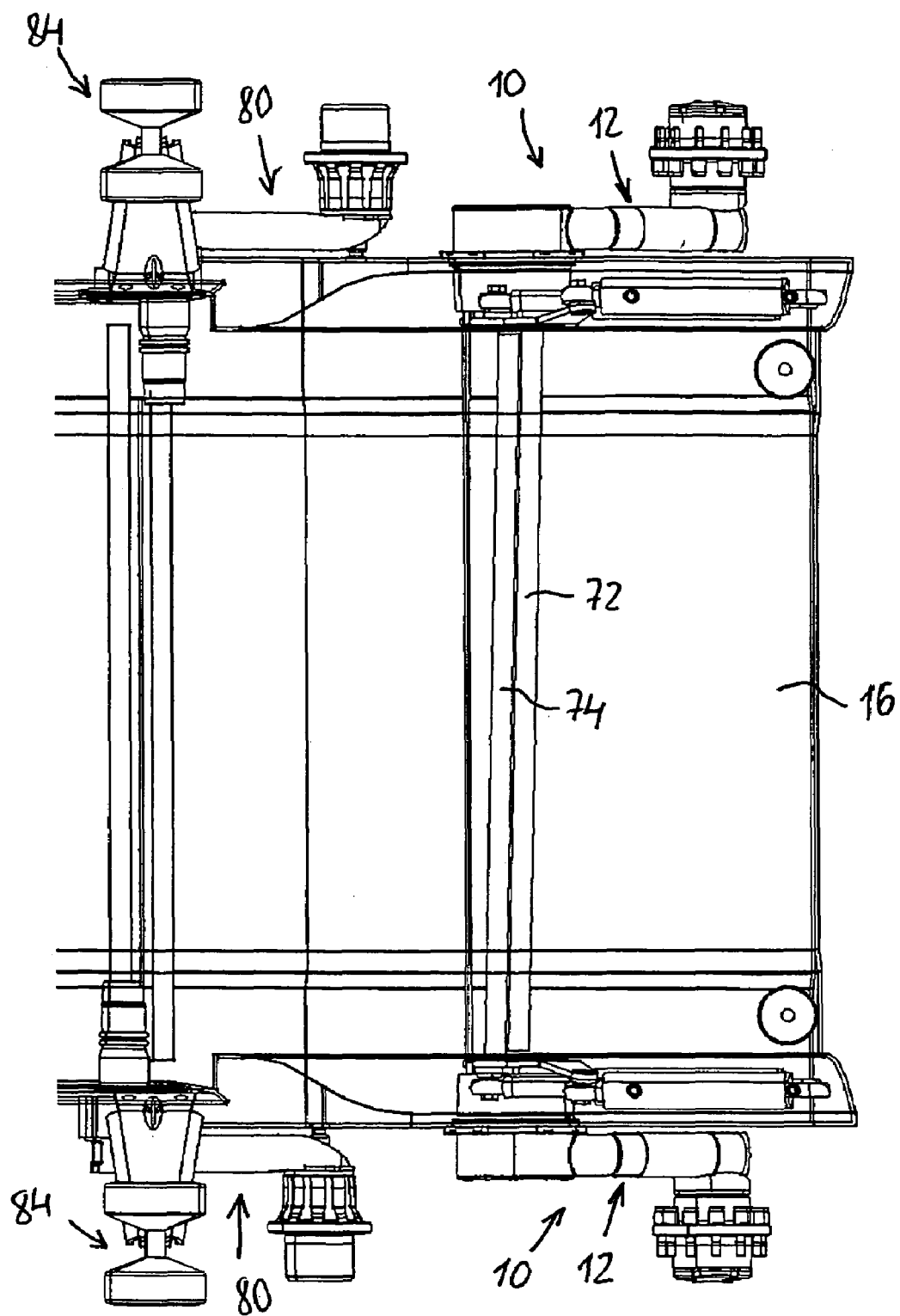
FIG. 4 is a plan view of the rear part of a tracked vehicle having a tension wheel station according to FIGS. 1 and 2 on each side of the vehicle.

As can be seen from the plan view in FIG. 4, a tension wheel station 10 is disposed on each side of the rear portion of the tracked vehicle. Each rocker arm 12 is further sprung by means of a respective torsion bar 72, 74, one end of which is fastened in an anchor 76 (FIG. 3) in the one tension wheel station 10 and the other end of which is connected to the opposite side of the hull 16 by an anchor 78 in the opposing tension wheel station 10 (FIG. 3). The torsion bars 72, 74 are rotated fully one degree in relation to the transverse direction of the vehicle to prevent them from colliding with each other.

Disposed in a known manner in front of the respective tension wheel station 10 are a plurality of trailing wheel units, one trailing wheel unit 80 of which is shown in FIGS. 1, 2 and 4. A supporting wheel 82 is designed to support an upper running part of the crawler track (not shown).

With the first hydraulic cylinder 62, the rocker arm 12, irrespective of its position, can be shortened in order to make it easier for a crawler track to be slipped on and taken off. Further, the track tension can be base-set to a desired value with the aid of the cylinder 62. After this, the cylinder 62 is locked in its position. With the hydraulic cylinder 64, the position of the rocker arm 12 and of the tension wheel is reset to either a swivelled-up position for best driving and track wear behaviour when travelling on a firm surface, or a swivelled-down position for optimal handling on a soft surface, such as snow, swamps and the like. In the latter case, the rotation of the hub portion 20 relative to the stationary eccentric sleeve 54 when the rocker arm 12 is swivelled down gives rise to an automatic extension of the rocker arm 12, which ensures that the track can receive a certain increased tension which is desirable to reduce the specific ground pressure when travelling on the soft surface. No separate action for adjusting the track tension is therefore necessary when altering the position of the tension wheel between its high and low position.

Even though, in the described embodiment, hydraulic cylinders 62 and 64 have been shown as the drive mechanisms for influencing the length and angular position of the rocker arm 12, it is possible, of course, within the scope of the inventive concept, to utilize other linear or rotary drive mechanisms to produce an equivalent manoeuvring function. For example, pneumatic cylinders, ball screws, electric or hydraulic motors with gear transmissions and the like would be conceivable.

What is claimed is:

1. Device for manoeuvring a tension wheel in a chassis of a tracked vehicle, in which the tension wheel is rotatably mounted on a free end of a telescopic rocker arm mounted pivotably about a transverse axis in the vehicle, the rocker arm being able to be lengthened and shortened by means of a first drive mechanism and being able to be swivelled about the transverse axis by means of a second drive mechanism for the purpose of raising and lowering the tension wheel, wherein the first drive mechanism is designed to be able to rotate a sleeve rotatable about the transverse axis in a hub part of an inner part of the rocker arm, which sleeve has an eccentrically mounted crank pin which is hinge-connected to an outer part of the rocker arm for the purpose of displacing the latter relative to the inner arm part in the event of a mutual rotation motion between the sleeve and the hub part of the inner rocker arm part in such a way that the rocker arm is lengthened upon a downward swivel motion of the arm and the tension wheel by courtesy of the second drive mechanism.

2. Device according to claim 1, wherein the second drive mechanism is configured to swivel the rocker arm by rotating the hub part of the inner rocker arm part.

3. Device according to claim 1, wherein the crank pin is connected to the outer arm part of the rocker arm via a first rod element, which is fixedly connected to the outer arm part and is slidably guided in a portion of the inner arm part which projects from the hub part.

4. Device according to claim 3, wherein the crank pin is hinge-connected to the first rod element via a link element.

5. Device according to claim 1, wherein the rocker arm (12), in cross section, has a larger dimension in height than in width and in that the outer arm part has a further rod element situated in essentially the same vertical plane as the first rod element and slidably guided in the said projecting portion of the inner arm part.

6. Device according to claim 1, wherein the first and second drive mechanism are constituted by a first and second hydraulic cylinder, respectively.

7. Device according to claim 6, wherein the first hydraulic cylinder is designed to act upon a lever arm of the sleeve rotatable in the hub part.

8. Device according to claim 6, wherein the second hydraulic cylinder is designed to act upon a lever arm of the hub part of the inner arm part of the rocker arm.

9. Device according to claim 6, wherein the second hydraulic cylinder is configured so as, in the swivelled-down position of the rocker arm and the tension wheel, to be able to allow a yielding, dampened swivel motion of the rocker arm.

10. Device according to claim 6, wherein the second hydraulic cylinder is configured so as, in the swivelled-up position of the rocker arm and the tension wheel, to be hydraulically locked in order to fix the rocker arm and the tension wheel in the swivelled-up position.

11. Device according to claim 6, wherein the first and the second hydraulic cylinder are disposed in an essentially parallel relationship above the rocker arm.

12. Device according to claim 1, wherein the swivel motion of each rocker arm is sprung with the aid of a respective torsion bar, one end of which is anchored in the hub part of the rocker arm and the other end of which is fixed in the hull of the vehicle on that side of the vehicle opposite this rocker arm.

13. Device according to claim 12, wherein the torsion bars extend essentially parallel with each other, transversely across the vehicle.

* * * * *